United States Patent
Nachimson

(10) Patent No.: US 9,026,482 B2
(45) Date of Patent: May 5, 2015

(54) METHOD AND SYSTEM FOR ANALYZING A LEGACY SYSTEM BASED ON TRAILS THROUGH THE LEGACY SYSTEM

(75) Inventor: Guy Nachimson, Givat Brener (IL)

(73) Assignee: Software AG, Darmstadt (DE)

( * ) Notice: Subject to any disclaimer, the term of this patent is extended or adjusted under 35 U.S.C. 154(b) by 521 days.

(21) Appl. No.: 12/659,373

(22) Filed: Mar. 5, 2010

(65) Prior Publication Data
US 2011/0153530 A1 Jun. 23, 2011

(30) Foreign Application Priority Data

Dec. 22, 2009 (EP) ..................................... 09180397

(51) Int. Cl.
G06F 17/00 (2006.01)
G06N 5/00 (2006.01)
G06F 11/34 (2006.01)
G06F 9/44 (2006.01)

(52) U.S. Cl.
CPC ............ G06F 11/3438 (2013.01); G06N 5/003 (2013.01); G06N 5/00 (2013.01); G06F 8/74 (2013.01); G06F 11/3476 (2013.01)

(58) Field of Classification Search
CPC .................................. G06N 5/003; G06N 5/00
See application file for complete search history.

(56) References Cited

U.S. PATENT DOCUMENTS

| 6,356,285 | B1 * | 3/2002 | Burkwald et al. | 715/853 |
| 6,836,780 | B1 | 12/2004 | Opitz et al. | |
| 7,003,560 | B1 * | 2/2006 | Mullen et al. | 709/223 |
| 2008/0250078 | A1 * | 10/2008 | Wimberly et al. | 707/202 |
| 2008/0270153 | A1 * | 10/2008 | Drapkin et al. | 705/1 |
| 2009/0235267 | A1 * | 9/2009 | McKinney et al. | 718/104 |
| 2009/0298465 | A1 * | 12/2009 | Choi et al. | 455/406 |

OTHER PUBLICATIONS

"Reverse Engineering Legacy Interfaces: An Interaction-Driven Approach", Stroulia et al., 1999 IEEE Comput. Soc., Oct. 6, 1999, pp. 292-302.

* cited by examiner

*Primary Examiner* — Kakali Chaki
*Assistant Examiner* — Peter Coughlan
(74) *Attorney, Agent, or Firm* — Nixon & Vanderhye, P.C.

(57) ABSTRACT

The present technology concerns techniques for analyzing a legacy system based on at least one trail. The at least one trail includes multiple instances of screens of the legacy system. Plural pair-wise distance measures of the screen instances in the at least one trail are calculated. The pair-wise distance measures indicate a similarity of the respective pair of screen instances that indicates that the pair may originate from the same screen of the legacy system. At least one cluster analysis algorithm is applied on the plural pair-wise distance measures to group the screen instances into at least one screen group, and a map of the legacy system is built based on the at least one screen group.

20 Claims, 13 Drawing Sheets

Fig. 3a

Figure 1:
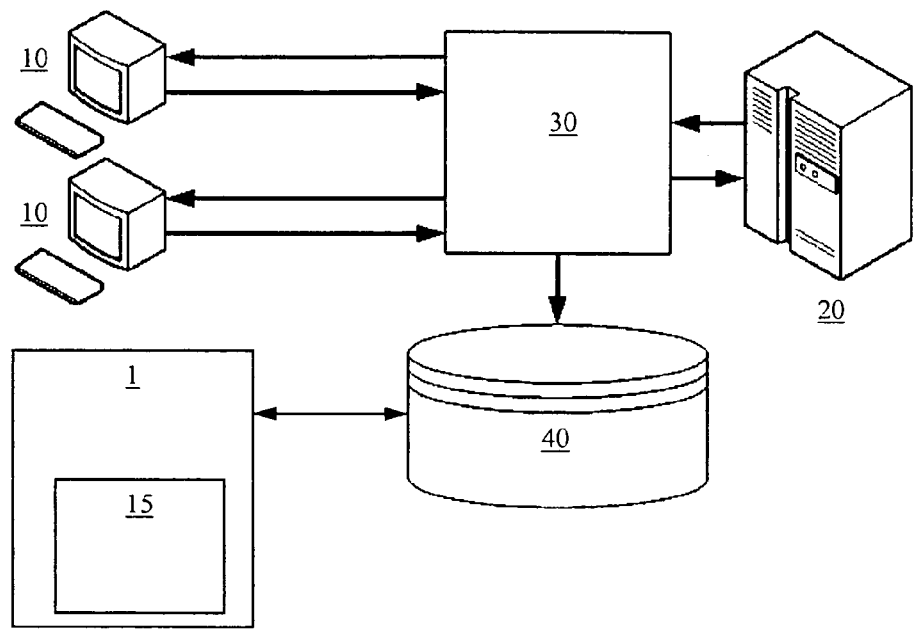

```
    Warehouse Menu
    ==============

1. Products
    2. Materials
    3. Suppliers

Select: _
```

Fig. 3b

```
DA5X1                      14:53
     GGGGGGG     000000
     GG    GG    OO    OO
     GG          OO    OO
     GG   GGGG   OO    OO
     GG    GG    OO    OO
     GGGGGGG     000000

Welcome to GO application!
```

Fig. 3c

```
         Sign on
         =======

User:     _____
    Password: _____
```

Fig. 3d

```
           Products
           ========
    A Item       Price   Qty
    _ Chair     100.00    50
    _ Table     165.00     0
    _ Shelf      50.00   104
    _ Bench      75.00     7

M=modify D=detail R=remove
```

Fig. 3e

```
      Product Details
      ===============

Name...: Chair
    Desc...: Sitting device
    Price..: 100.00
    Qty....: 50

F3 = back    F4 = modify
```

Fig. 3f

```
       Search Product
       ==============

Name . . .: _____
    Min Price.:  30.00
    Max Price.: 150.00
    Min Qty. .:   10

F3 = back    F4 = search
```

Fig. 3g

```
+-------------------------------+
|        Update Product         |
|        ==============         |
|                               |
| Name...: Chair_____          |
| Desc...: Sitting device       |
| Price..:   100.00             |
| Qty....:    50                |
|                               |
| F3 = cancel    F4 = save      |
+-------------------------------+
```

Fig. 3h

```
         +------------------+
   Up    | Select Type:     |
   ==    | _ Food           |
         | _ Clothes        |
 Name... | _ Furniture      |
 Desc... | _ Music          |
 Price.. |                  |
 Qty.... +------------------+
 Type...: ___
 F1 = help    F4 = save
```

Fig. 3i

```
+-------------------------------+
|        System message         |
|        ==============         |
| System maintenance is         |
| scheduled for 22:00,          |
| 14-AUG. Users are asked       |
| to close all sessions         |
| and defer scheduled jobs.     |
|                               |
| Press ENTER to continue       |
+-------------------------------+
```

METHOD AND SYSTEM FOR ANALYZING A LEGACY SYSTEM BASED ON TRAILS THROUGH THE LEGACY SYSTEM

This application claims priority to EP Application No. 09180397.3, filed 22 Dec. 2009, the entire contents of which is hereby incorporated by reference.

TECHNICAL FIELD

The present technology relates to a method and a system for analyzing a legacy system based on trails through the legacy system.

RELATED ART

Organizations oftentimes use applications running on legacy systems, such as mainframes, that have been in place for a long time and serve for driving mission-critical computations. However, adapting such legacy systems and their applications to changing needs of an organization is extremely difficult for a number of reasons. For example, the source code of the legacy application may no longer be available, so that any adaptation of the functionality of the legacy application is impossible. Even if the source code is still available (which is typically written in first-generation programming languages such as COBOL), there is typically no personnel available that can correctly adapt the code due to a lack of expertise with deprecated programming languages or a lack of documentation of the code. In summary, a legacy system can be regarded as a "black box" that performs the tasks it was originally developed for, but it is extremely difficult or even impossible to determine how exactly the tasks are achieved, i.e. it is impossible to gain knowledge of the functionality of the legacy system.

Legacy systems typically communicate with one or more terminal emulators, wherein the terminal emulators serve for displaying screens of the legacy application running on the legacy system and allowing users to input data into data fields of the screens. The user input is then transmitted back to the legacy system, which responds by transmitting the next screen to the terminal emulator. In summary, a session of a user with a legacy system can thus be regarded as a sequence of displayed screens (screen instances) connected by user inputs.

In order to understand the functionality of a legacy system, it is known to analyze the data provided by the legacy system in order to try to extract the screens communicated to and from the legacy system as well as their dependencies. The extracted screens can then be used for building a map, i.e. a model, of the legacy system, wherein the map may be a finite state machine whose nodes represent the screens and whose transitions represent the user inputs.

A central difficulty in this mapping process is the identification of the individual screens of the legacy system. Since the intercepted data from the communication between the legacy system and the terminal emulator(s) comprises concrete screen instances, i.e. screens with concrete filled-in data fields, it is very difficult and in some scenarios even impossible to decide whether two encountered screen instances belong to the same screen or to different screens.

To this end, systems such as ApplinX of applicant are known that serve for modeling legacy systems, e.g. by letting a developer manually identify the screens or by importing screen maps (e.g. from Natural or Mainframe BMS/MFS systems). However, in the manual approach, the navigation steps are typically captured based on a developer's (rather than real user's) navigation through the legacy system, which results in incomplete or simply incorrect screen groupings and identifications. On the other hand, importing host screen maps typically only allows an analysis of the screen data and does not take into account the navigation and relation between the individual screens (e.g. the user inputs). A further approach is "crawling" the screens of the legacy system (similar to a crawler that crawls the internet for a search engine), however, this approach is limited to a test environment or to screens that do not modify data. Furthermore, most known approaches require additional components to be installed on the mainframe (e.g. datadirect, JIS innovator), which is difficult or even impossible depending on the type of legacy system to be analyzed.

Moreover, the U.S. Pat. No. 6,836,780 B1 discloses a method and apparatus for mapping legacy application data. In a first phase, interaction with the legacy application is recorded as trails, wherein each trail comprises snapshots of every screen encountered as well as all keystrokes entered. Based on the recorded trails, a map of the legacy application is built by sorting the encountered screen snapshots into screens. This sorting is done based on simple screen identification rules that try to allocate snapshots according to the number, size and location of predefined fields found in the individual snapshots. However, the simple screen identification rules are only sufficient to identify very simple screens and thus the method proposed in the U.S. Pat. No. 6,836,780 B1 depends on a high amount additional manual action, such as manually identifying any un-encountered screens, correcting falsely grouped screen snapshots or manually tagging unique combinations of screen data. Consequently, it is not possible to reliably and completely build a proper map of the legacy application without a high amount of laborious and error-prone user intervention.

Furthermore, the U.S. Pat. No. 6,697,088 B1 discloses a graphical presentation system for legacy applications. However, the system relies on known screen identification techniques (such as presented above) and therefore cannot help to improve the identification of screens of a legacy application to be analyzed.

It is therefore the technical problem underlying the present technology to provide a method and system that generates maps/models of a legacy system in a more reliable and complete manner and thereby at least partly overcomes the above explained disadvantages of the related art.

SUMMARY OF THE TECHNOLOGY

This problem is according to one aspect of the technology solved by a method for analyzing a legacy system based on at least one trail, wherein the at least one trail comprises a plurality of instances of screens of the legacy system. In the embodiment of claim 1, the method comprises the following steps:

a. calculating a plurality of pair-wise distance measures of the plurality of screen instances in the at least one trail, wherein the pair-wise distance measures indicate a similarity of the respective pair of screen instances that indicates that the pair may originate from the same screen of the legacy system; and b. applying at least one cluster analysis algorithm on the plurality of pair-wise distance measures to group the screen instances into at least one screen group and building a map of the legacy system based on the at least one screen group.

Accordingly, the embodiment defines a method that produces a map of the analyzed legacy system based on user activity that was logged into trails of screen instances. The map is built by grouping individual screen instances that belong to the same screen of the legacy system into screen groups based on pair-wise distance measures preferably calculated for each pair of screen instances within the trail(s). Since the pair-wise distance measures indicate a similarity of the respective pair of screen instances that helps to derive a probability of both screen instances belonging to the same screen of the legacy system, the present method provides a stochastic/probabilistic approach to obtain the map of the legacy system. The stochastic/probabilistic approach increases the reliability of automatic screen group detection to a great extent, as compared to the simple screen identification rules known from the prior art, which involves a considerable amount of manual work. For example, the simple screen matching employed in the U.S. Pat. No. 6,836,780 B1 groups two given screen instances into a group if they contain the same fields in the same location. As a result, such a binary prior art decision algorithm only provides insufficient screen grouping results and therefore requires a high amount of laborious manual fine tuning work. On the contrary, due to the derived distance measures, the present method provides for a much more exact determination of which screen instances in a given trail belong to the same screen of the analyzed legacy system, thereby considerably increasing the quality of the generated maps of the legacy system, preferably without any manual interaction.

In one aspect of the present technology, the first of the above method steps may comprise the step of calculating a pair-wise distance score of the plurality of screen instances, wherein the pair-wise distance score indicates a similarity of the respective pair of screen instances that indicates that the pair may originate from the same screen based on the content of the respective screen instances. Accordingly, a statistical content analysis may be performed on the screen instances in order to determine if two given screen instances belong to the same screen. Preferably, the pair-wise distance score is calculated based on at least one screen parameter such as the amount of alpha-numeric characters, the amount of unprotected fields, the amount of unprotected hidden fields, the amount of digits, the amount of alpha characters, the amount space characters, the amount of unique characters, a column entropy score, the amount of unique colours, the amount of characters in reversed video mode, the amount of characters in intensified mode, the percentage of characters in uppercase compared to all characters, the amount of words and/or any combination thereof. Accordingly, the present technology provides a number of improved parameters as compared to the prior art, where the screen identification is merely based on the number, size and location of the fields of the screen instances. Preferably, one or more of the above screen parameter scores are calculated for each screen instance and the calculated scores of two screen instances are numerically combined into a pair-wise distance score. This pair-wise distance score may then be used to derive the distance measure, as will be further explained in the detailed description below.

In a further aspect of the present technology, the first of the above method steps may comprise the step of calculating a pair-wise similarity score of the plurality of screen instances, wherein the pair-wise similarity score indicates a similarity of the respective pair of screen instances that indicates that the pair may originate from the same screen based on the structure of the respective screen instances. Accordingly, the determination of which screen instances belong to the same screen of the legacy system may rely on an analysis of the structure of the given screen instances. In one aspect, the pair-wise similarity score may be calculated based on an identification of at least one field partition in the respective screen instance, wherein the at least one field partition comprises a plurality of related fields within a screen instance. Accordingly, the present technology may analyze the fields (such as input fields, labels, etc.) within the screen instances and group related fields into field partitions/segments. In other words, a field partition/segment groups fields of a screen instance that semantically belong together (e.g. label/input field pairs). Based on the field partitions, textual patterns may be identified in order to compare two given screen instances and to decide whether the two screen instances belong to the same screen or not.

In yet another aspect, the first of the above method steps may comprise the step of identifying at least one navigation pattern within the at least one trail and grouping the screen instances within the at least one trail according to the at least one identified navigation pattern. Accordingly, also navigational information extracted from the trail(s) (such as user inputs provided for navigating from one screen instance to the next) and/or the observed sequence of screen instances within the respective trail may be used in order to refine the grouping of the screen instances into screen groups, as will be further explained in the detailed description below.

In a preferred embodiment, the first of the above method steps may comprise the step of combining the pair-wise distance score and the pair-wise similarity score of a given pair of screen instances into a combined parameter and segment based distance score, preferably based on a pre-defined weight function. Accordingly, the results of the statistical content analysis and the structure analysis may be combined to derive a single combined parameter and segment based distance score per pair of screen instances, as will be further explained in the detailed description below.

Additionally or alternatively, at least one combined parameter and segment based distance score may be calculated for at least one pair of corresponding neighbours of the given pair of screen instances. Accordingly, the decision whether two given screen instances belong to the same screen of the legacy system may not only rely on the scores derived for this particular pair of screen instances, but also on further scores calculated for neighbouring screen instances (i.e. screen instances that are located before or after the respective screen instance within the sequence given in the trail).

Furthermore, the method may comprise the further step of grouping a plurality of fields comprised in a given screen instance into a set of static fields and a set of dynamic fields and assigning the given screen instance to the at least one screen group based on the set of static fields while ignoring the set of dynamic fields. Accordingly, the screen instances may be segmented into partitions, e.g. according to textual patterns based on predefined and/or editable rules. This way, field partitions within the screen instances are identified that preferably contain a uniform and related type of text, such as a title of the respective screen, a header of a table, a label/value pair, or further characteristic portions of an encountered screen instance, as will be explained in more detail in the detailed description below. Applicant has found that basing the screen identification on potentially dynamic fields (which may very well differ in number, size and location between two screen instances that nevertheless belong to the same screen) leads to a considerable amount of falsely identified screens, e.g. two screen instances are incorrectly assigned to the same screen (although they belong to different screens) or they are incorrectly assigned to different screens (although they belong to the same screen). Therefore, the present technology departs from the known screen identification approaches by providing a more precise and therefore reliable screen identification, i.e. basing the screen identification only on the static fields and disregarding any dynamic fields, which considerably improves the quality and correctness of the maps generated for the analyzed legacy systems. It is noted that preferably no user intervention is needed in the inventive screen identification process, which is therefore more efficient than the laborious and error-prone manual approaches known from the prior art.

Additionally or alternatively, the method may comprise the further step of categorizing the at least one screen group by matching the at least one screen group against a predefined rule set and assigning at least one type to the screen group according to the rule set. Accordingly, the identified screen groups are typed, which further improves the quality of the generated map, since categorizing the screen groups into different types of screens (e.g. a menu screen, a login screen, etc.) allows for further semantic analyses, as will be explained in the detailed description below. The typing of the at least one screen group is in this aspect based on a predefined rule set, so that the typing can be accomplished automatically without any user intervention.

However, in some instances, especially when operating on screen instances with complex content, the automatic typing may still provide more than one candidate type of the respective screen group. To this end, the method may comprise the further step of refining the categorization/typing based on information extracted from user input extracted from the at least one trail in order to assign only one type to the screen group (see the detailed description below).

The present method may further comprise the step of analyzing the at least one trail for a second time to refine the map based on information extracted from the at least one trail. Accordingly, this aspect provides an incremental approach, in that an already analyzed trail may be analyzed a second time and matched against the map that was generated during the first run, as will be further explained in the detailed description below. Similarly, the method may comprise the further step of analyzing at least one second trail to refine the map based on information comprised in the at least one second trail. This way, the generated map is further refined each time a new trail is analyzed and thus "stabilizes" over time.

The present technology is further directed to a computer program comprising instructions for implementing any of the above methods.

Moreover, the present technology provides a system for analyzing a legacy system based on at least one trail, wherein the at least one trail comprises a plurality of instances of screens of the legacy system and wherein the system comprises:
a. a screen identification component adapted for calculating a plurality of pair-wise distance measures of the plurality of screen instances in the at least one trail, wherein the pair-wise distance measures indicate a similarity of the respective pair of screen instances that indicates that the pair may originate from the same screen of the legacy system;
b. wherein the screen identification component is further adapted for applying at least one cluster analysis algorithm on the plurality of pair-wise distance measures to group the screen instances into at least one screen group and for building a map of the legacy system based on the at least one screen group.

The system may further comprise a redirector, wherein the redirector is adapted for recording the at least one trail by analyzing communication between the legacy system and at least one terminal during at least one live user session. Accordingly, it is not necessary to install any processing components on the legacy system to be analyzed, as in the prior art. On the contrary, the present technology takes a "zero footprint" approach, in that the redirector passively analyzes the communication between the legacy system and the connected terminal(s) and thus does not interfere with the legacy system at all.

The redirector may be further adapted for recording a plurality of trails and for storing the plurality of recorded trails in a data store, wherein the screen identification component is adapted for analyzing the plurality of stored trails. Accordingly, large amounts of real life user sessions can be recorded and later analyzed by the system of the present technology.

Further advantageous modifications of embodiments of the system of the technology are defined in further dependent claims.

SHORT DESCRIPTION OF THE DRAWINGS

Figure 2:
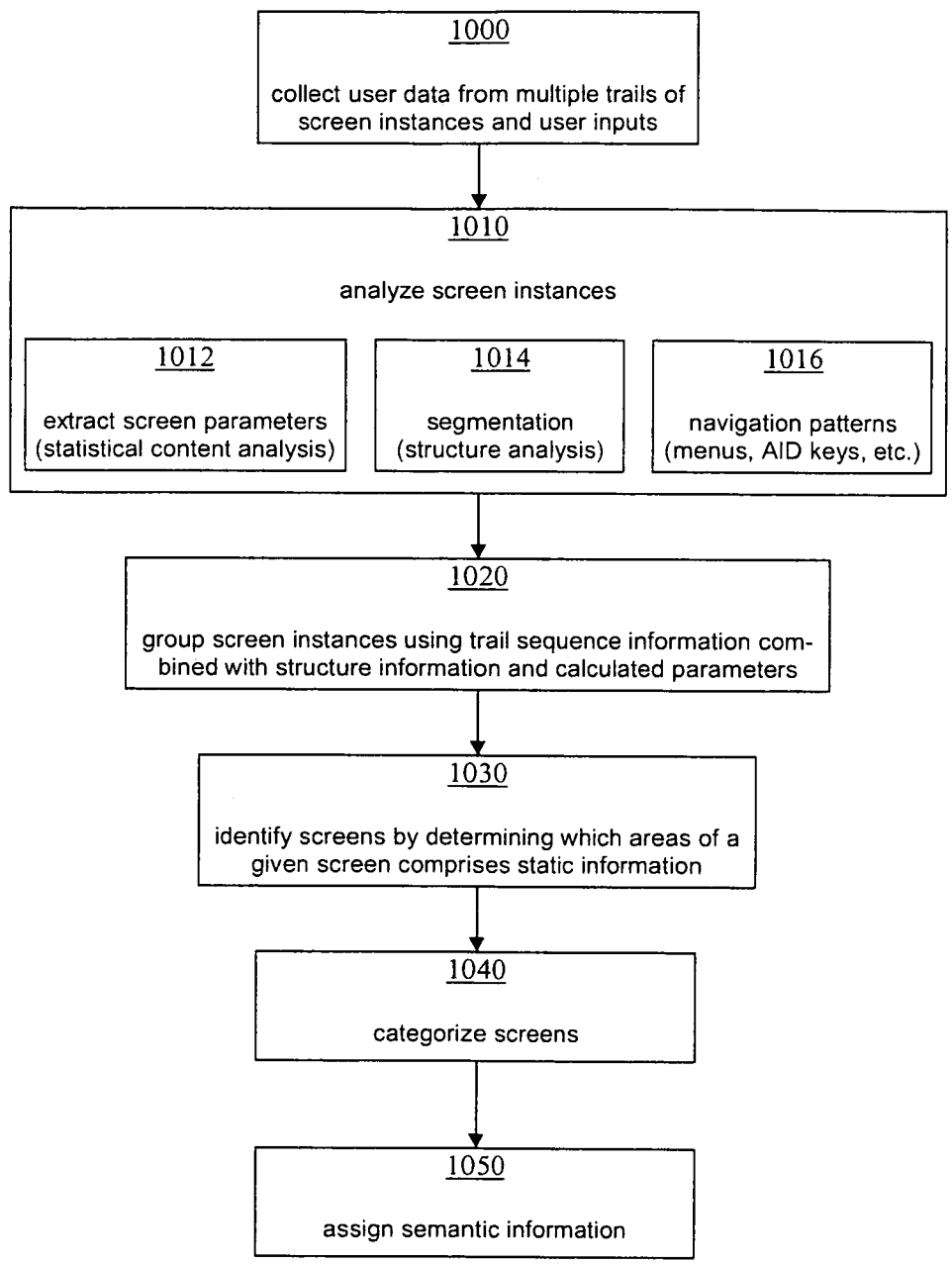
Figure 4:
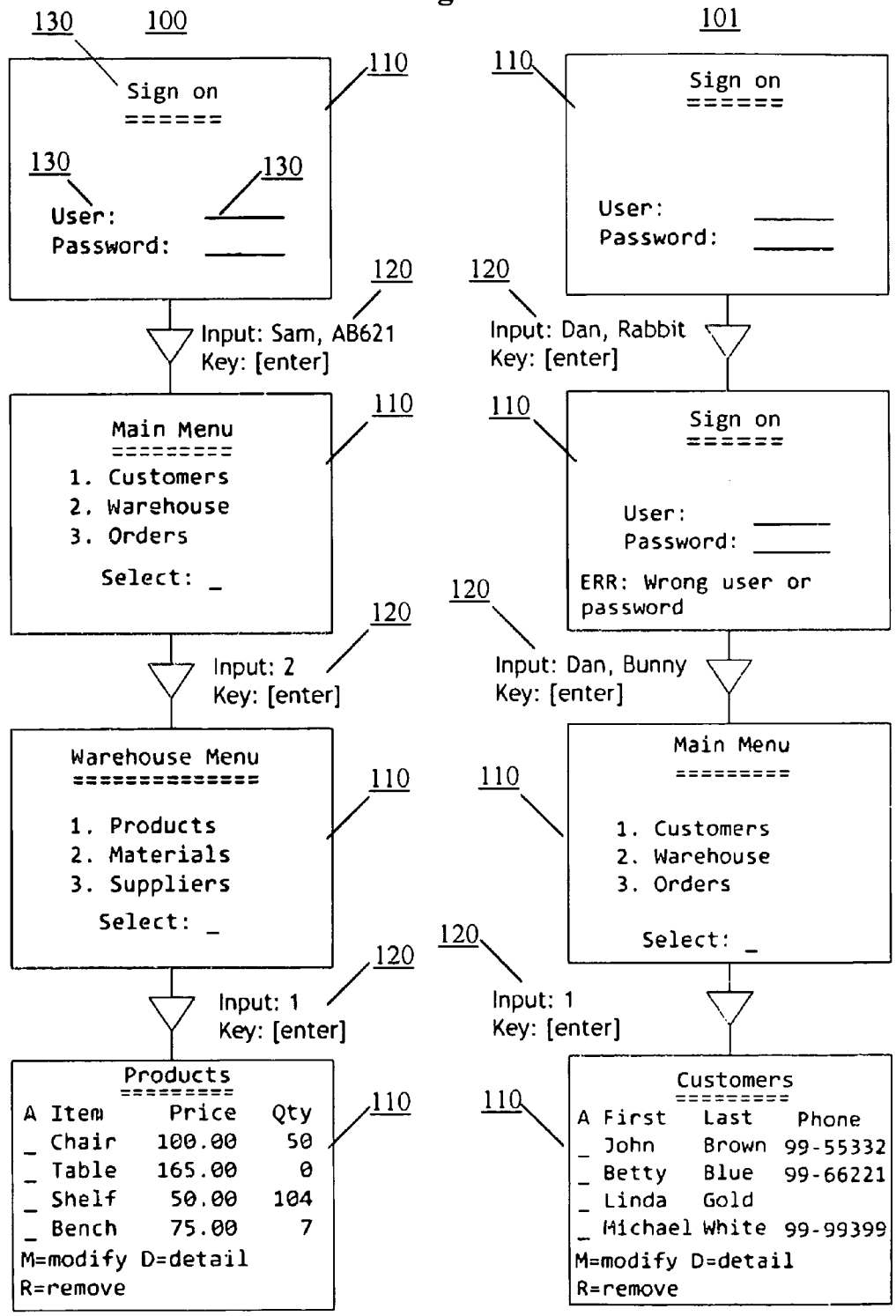
Figure 5:
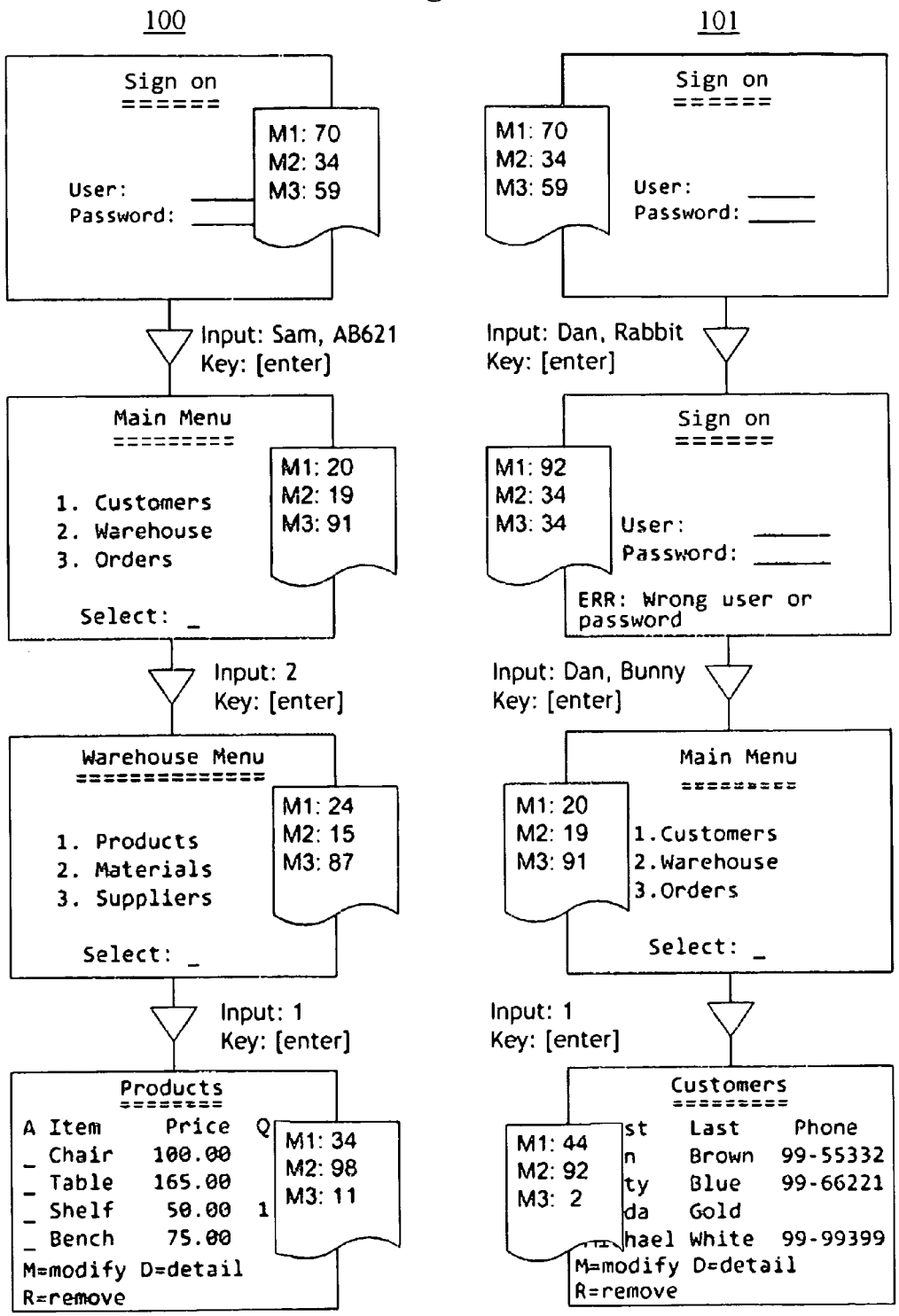
Figure 6:
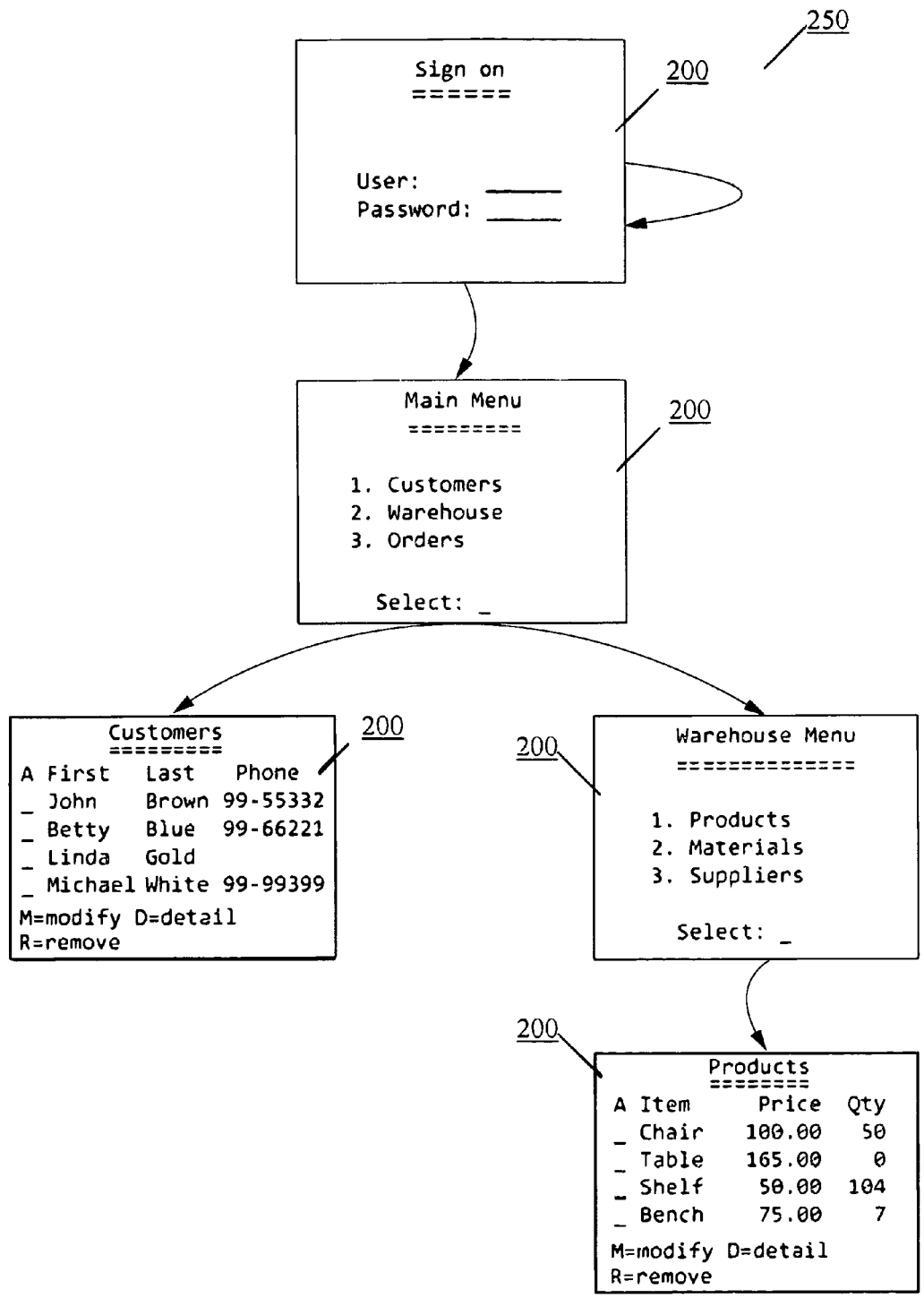
Figure 7:
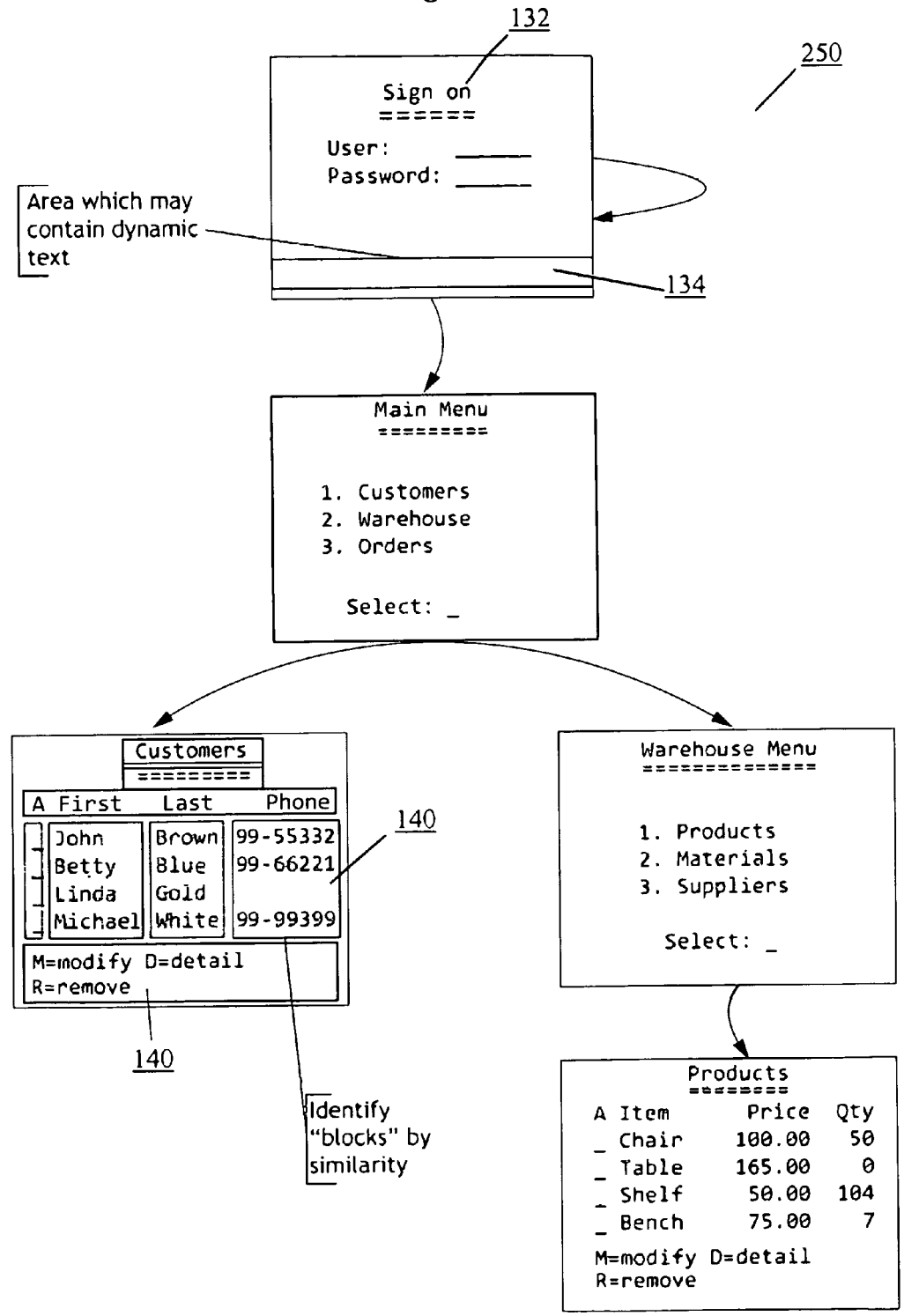
Figure 8:
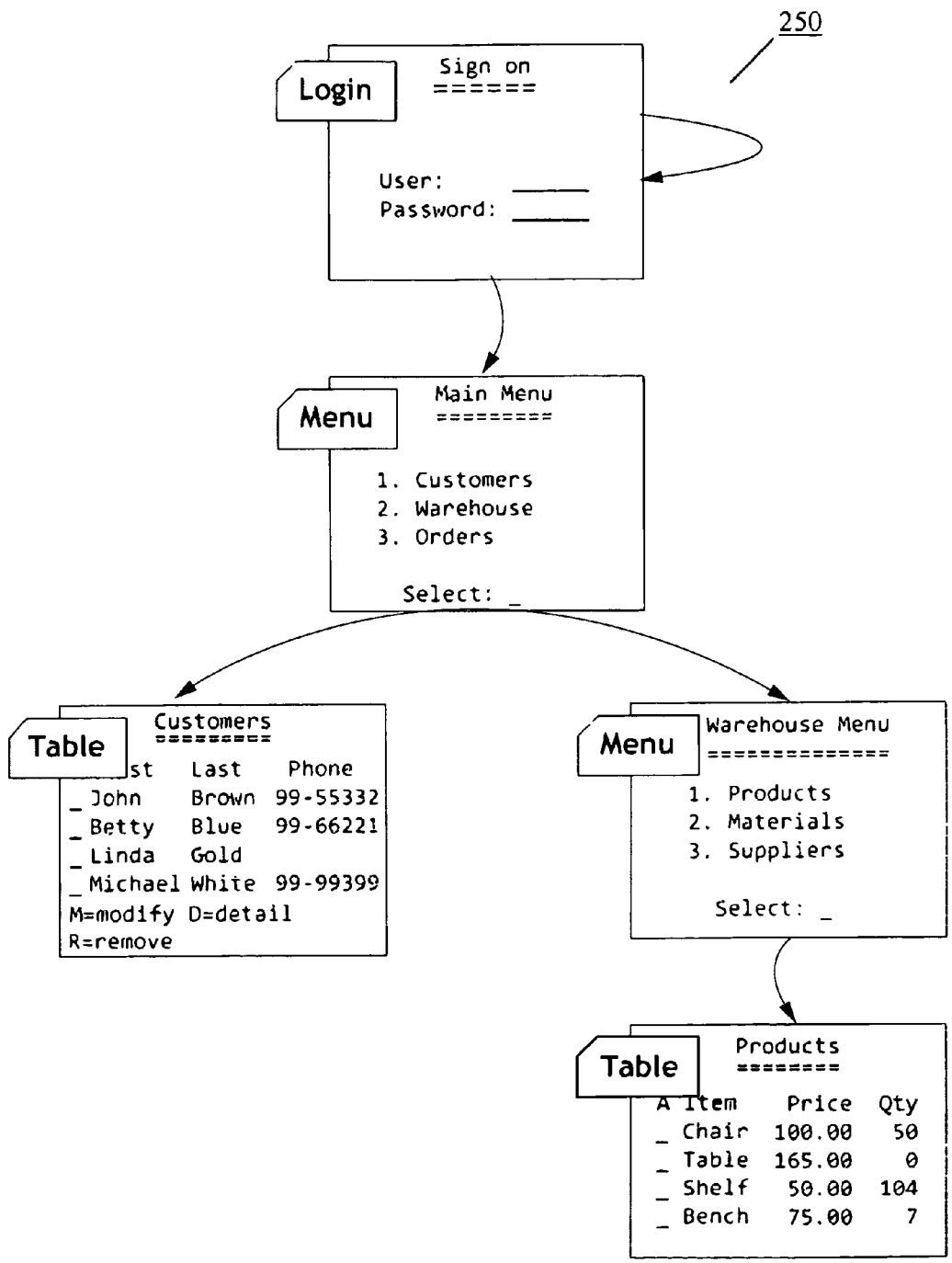
Figure 9:
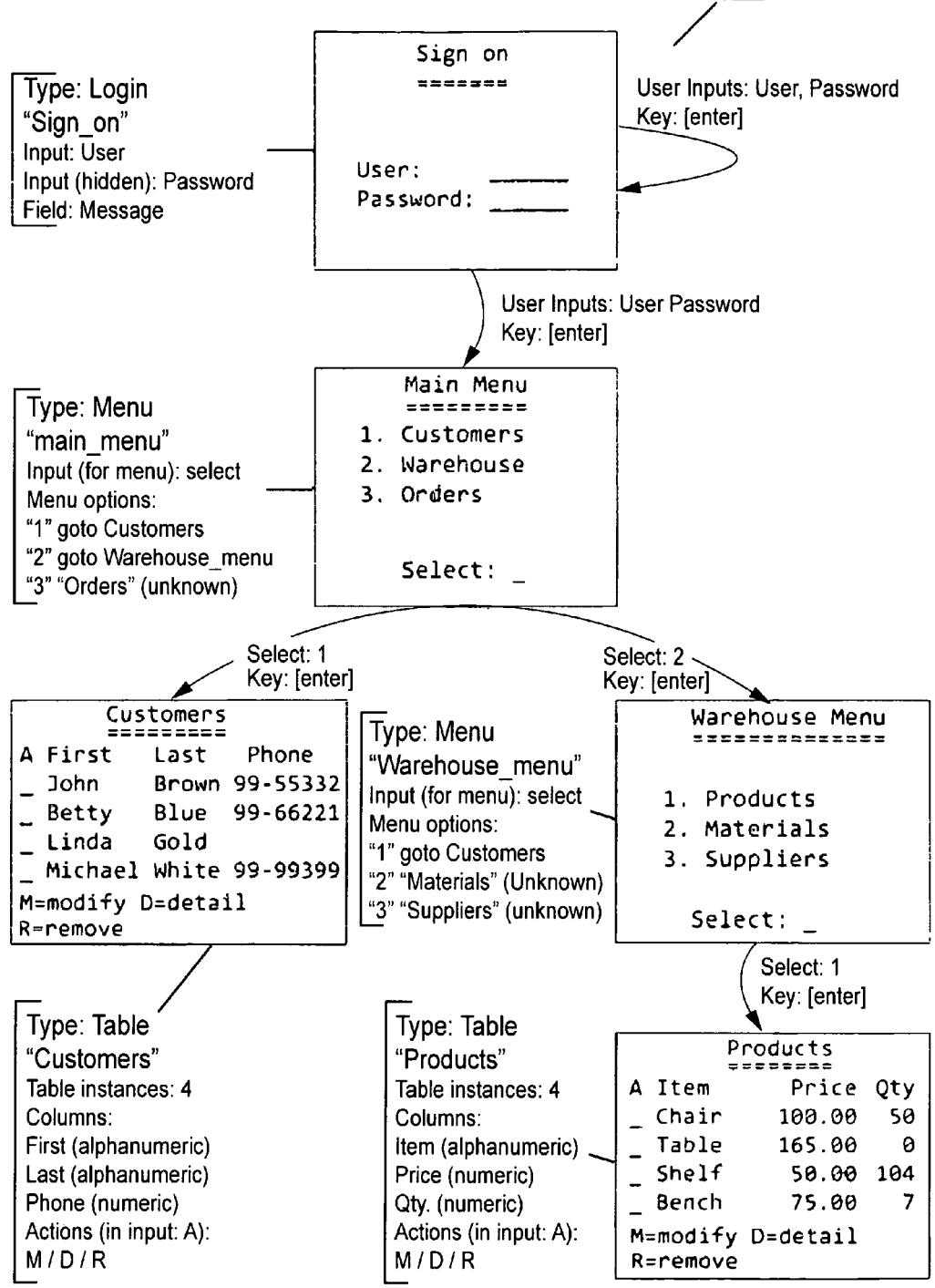
Figure 10:
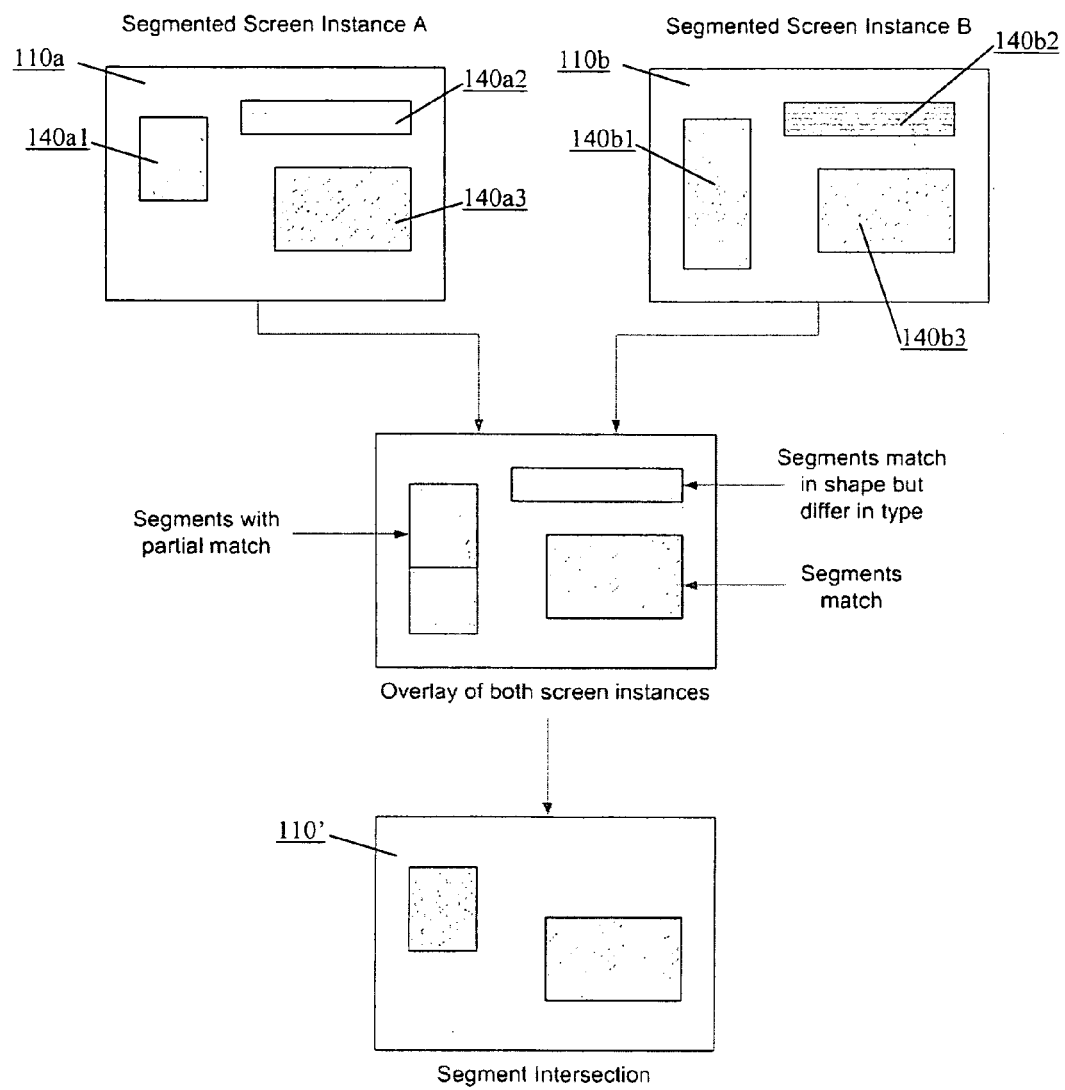
Figure 11:
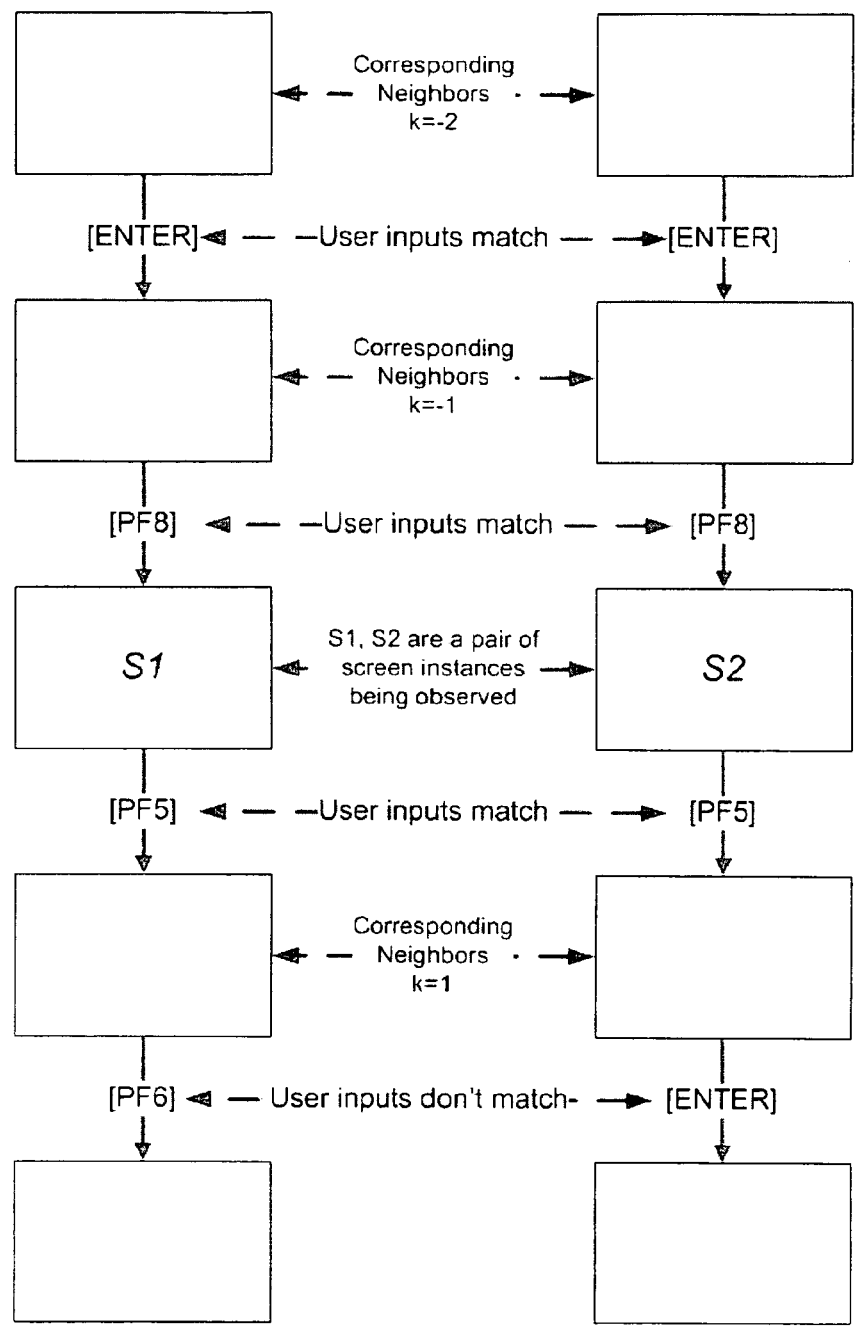
Figure 12:
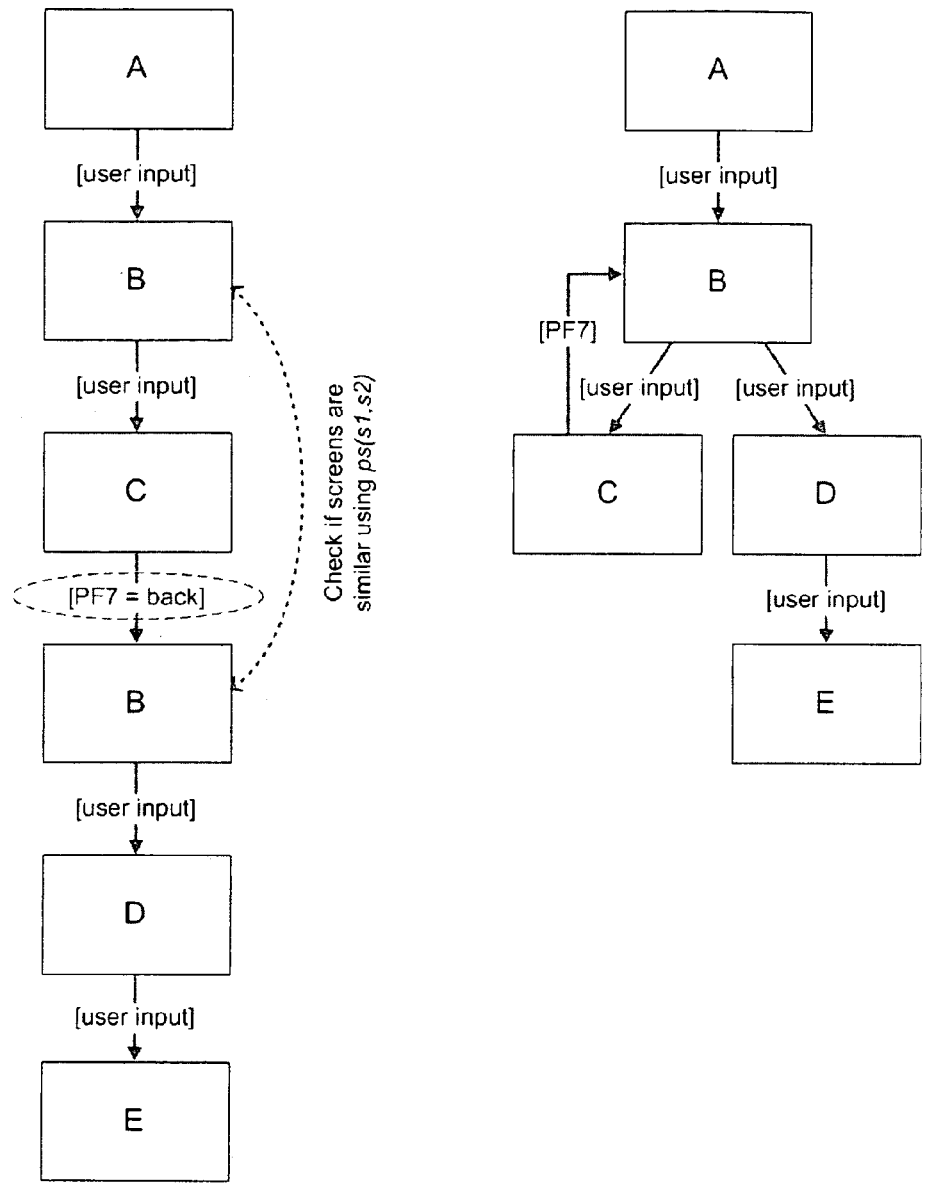

In the following detailed description, presently preferred embodiments of the technology are further described with reference to the following figures:

FIG. 1: A block diagram showing a system in accordance with an embodiment of the present technology;

FIG. 2: A flowchart showing processing steps performed by a method in accordance with an embodiment of the present technology;

FIGS. 3a-i: Screenshots of exemplary screens provided by a legacy system in accordance with an embodiment of the present technology;

FIG. 4: Two exemplary traces through a legacy system in accordance with an embodiment of the present technology;

FIG. 5: Two exemplary traces through a legacy system with annotated screen parameters in accordance with an embodiment of the present technology;

FIG. 6: A map of a legacy system resulting from a grouping of screen instances in accordance with an embodiment of the present technology;

FIG. 7: A map of a legacy system resulting from an identification of static and dynamic areas in accordance with an embodiment of the present technology;

FIG. 8: A map of a legacy system resulting from a categorization of identified screen groups in accordance with an embodiment of the present technology;

FIG. 9: A map of a legacy system with assigned semantic information in accordance with an embodiment of the present technology;

FIG. 10: A schematic view of structure analysis performed for two given screen instances in accordance with an embodiment of the present technology;

FIG. 11: A schematic view of two trails any identified corresponding neighbours in accordance with an embodiment of the present technology; and FIG. 12: A schematic view of pre-processing a trail in accordance with an embodiment of the present technology.

DETAILED DESCRIPTION

In organizations that have a legacy system, such as a mainframe, as a core system, it is desired to model the structure of the user interface of applications running on the mainframe, e.g. in order for the legacy application to interact with external systems. Such external systems may be screen based modernization products, tools analyzing user interactions with the mainframe (for reasons such as fraud detection, business process measurement or process optimization), tools for training mainframe users, etc. Such a modeling is aimed at identifying information about the legacy application/legacy system, such as the names of screens, means to identify an instance of a named screen, a graphical representation of such an instance (e.g. a screen image or a thumbnail), means to navigate to other screens (e.g. required input and send keys), relationships between neighboring screens (e.g. one-to-one, one-to-many) and/or additional information about the data the screens provide and what kind of inputs a user might enter into the screens. The present technology therefore proposes in some embodiments to automatically generate accurate and complete models, i.e. maps, of legacy systems.

FIG. 2 shows a flowchart of processing steps performed by an embodiment of the present technology comprising the steps of collecting user data 1000, analyzing screen images/instances 1010 (comprising statistical content analysis 1012, structure analysis 1014 and/or identification of navigational patterns 1014), grouping screen instances 1020, identifying screens 1030, categorizing screens 1040 and/or assigning semantic information 1050. It will be appreciated that various embodiments of the present technology may provide all or only a subset of the above steps and related functionalities, as well as different orders of the steps. In the following, each of the steps depicted in FIG. 2 will be described in more detail.

Collecting User Data 1000

FIG. 1 shows a system 1 according to an embodiment of the present technology. As can be seen in FIG. 1, a legacy system 20 communicates with one or more terminals 10. The communication between the legacy system 20 and the terminal(s) 10 is intercepted by a redirector 30, which records one or more trails 100, 101 (cf. FIG. 4) and stores the recorded trails 100, 101 in a data store 40. The system 1 and its screen identification component 15 shown in FIG. 1 may then analyze the recorded trails 100, 101 (see further below). To this end, the screen identification component 15 may be adapted for performing all or at least a subset of the functionality described in the following.

FIG. 4 depicts two exemplary trails 100 and 101. Trail 100 comprises a sequence of screen instances 110 that represent a user navigating to a products list. Trail 101 comprises a sequence of screen instances 110 that represent a user that fails to login once and then navigates to a customers list. As can be seen in FIG. 4, each trail 100, 101 comprises a sequence of encountered screen instances 110 connected by user inputs 120 that lead from one screen instance to the next. Each screen instance 100, 101 may comprise any number of fields 130, such as labels, input fields, headers, etc.

Analyzing Screen Images 1010

Step 1010 preferably comprises analyzing a single screen instance 110 within a trail 100, 101 and may be repeated for each screen instance 110. Preferably, step 1010 comprises three sub-steps, namely statistical content analysis 1012, structure analysis 1014 and identification of navigational patterns 1014. However, it will be appreciated that various embodiments may only employ some of the sub-steps 1012, 1014 and 1014.

During statistical content analysis 1012, a number of screen parameters are preferably employed to calculate scores based on the content of the investigated screen instance 110, e.g. the number of alpha-numeric characters, the number of unprotected fields 130, the number of unprotected hidden fields 130 (e.g. password fields), the number of digits, the number of alpha characters, the number of space characters, the number of unique characters, a "column entropy" score (a score indicating the level of order in columns, e.g. based on a simplified version of Hough Transform or RANSAC), the number of unique colors, the number of characters in "reversed video" mode, the number of characters in "intensified" mode, the percentage of characters in uppercase mode out of all text, the number of words and/or any combination thereof. FIG. 5 shows the two exemplary trails 100, 101 from FIG. 4, wherein the individual screen instances 110 have been annotated with the scores calculated from the screen parameters (see the scores M1, M2 and M3 in FIG. 5).

Furthermore, during structure analysis 1014, the screen instances 110 are preferably segmented into one or more field partitions 140 (also referred to as "segments" hereinafter) in order to identify characterizing portions within the screen instances 110. Each field partition 140 preferably comprises a number of individual fields 130 that "semantically" belong together (e.g. a field 130 representing an input field and a field 130 representing a corresponding label), however, a field partition 140 may alternatively comprise only one field 130. For example, based on predefined (and editable) rules, each screen instance 110 may be segmented into field partitions 140 according to textual patterns. The idea is to identify rectangles on the screen instance 110 that contain a uniform type of text, e.g. by employing a image segmentation, or a simplified version thereof. The screen segmentation may identify field partitions/segments 140 such as a screen title, a system clock, a table header area, a column (e.g. with type unprotected, numeric, free text, etc.), a free text, a label/value pair and/or a "decoration" text (e.g. in splash screens or separators).

A further type of analysis preferably employed at this stage is navigation pattern matching 1014, which serves for identifying patterns within the trails 100, 101. In one embodiment, systems such as Jacada Interface Server or webMethods ApplinX of applicant may be used to identify meaningful typical mainframe navigation patterns (green screen patterns) based on customizable predefined patterns. Exemplary patterns comprise:

AID (action identifier) keys: legacy application screens may show at the bottom of the screen a list of AID keys (also referred to as PF keys) with a label describing their meaning within the respective screen, e.g. "PF1—Help", "PF3—Save", "PF7—Back", "PF8—Next Page". A user of the terminal emulator pressing one of the AID keys within a given screen typically triggers the legacy mainframe to navigate to a subsequent screen, which is then displayed at the terminal emulator. Such AID keys are typically comprised within the recorded trails 100, 101 as navigational information.

Menus: legacy applications may comprise menu screens to allow navigating between different logical parts and functionalities of the legacy application. Such menus typically have a distinct structure, e.g. each menu item may comprise a 1 to 2 digit numeric value, followed by a dot, a white space, and a menu item description. A list of menu items is typically vertically aligned, with one item per row. Under the menu items list, there may be an unprotected field in which the user is expected to enter the numeric value that represents the selected menu item. Such menu information, once identified within a given screen, may be used to draw conclusions about which screen is to be expected next within the corresponding trail based on the AID key selected.

Employing such customizable patterns to analyze the content of screen instances can provide valuable information for later grouping the screen instances when combined with the trails sequence of screen instances and user inputs. For example:

If a menu pattern is recognized, any menu value entered in the menu selection field followed by an "enter" AID key would be expected to consistently lead to the same application screen. In screens with no menu, values entered in unprotected fields usually do not have such a strong correlation with the identity of the next screen.

Furthermore, e.g. the key "PF7" may be identified to mean "Back" in a given screen instance B and/or a dictionary may be used to map the corresponding key label (in whatever language it would appear) to the semantic meaning of "Back". Given an exemplary trail 100, 101 such as:

[instance A]→[any user action]→[instance B]→[PF7]→[instance C]

There is a high probability that screen instance C can be grouped (see below) with screen instance A, since the AID key "PF7" which represents a "back" action was pressed in screen instance B.

Grouping Screen Images 1020

In step 1020, the method may start generating groups 200 of screen instances 110 for the map 250 to be built, preferably by running one trail 100, 101 after the other. In the first run, the application map 250 is thus preferably generated based on the first trail 100, which was preferably amended/annotated with the above described information from the screen instance analysis step 1010.

The grouping of the screen instances 110, i.e. the determination of which screen instances 110 belong to the same screen of the legacy system 20 or to different screens, may be based on the user input 120 (comprising one or more AID keys) identified within the trails 100, 101 combined with navigational patterns (see above), on one or more scores calculated by means of screen parameters (see above), on the field partition 140 structure (see above) or any combination thereof.

To this end, rules for using the above information in order to match screen instances 110 may be predefined, but allow customization according to specific rules that apply to the specific application scenario the technology is employed in. The rules may be adjusted using various techniques (e.g. manually or by applying machine learning algorithms), e.g. to change the significance of each measured screen parameter in the screen instance comparison equation.

In the following, a preferred grouping algorithm will be described: As already presented above, the present technology provides three analysis modules: statistical content analysis 1012 based on screen parameters, structure analysis 1014 based on screen segments and/or identification of navigational patterns 1016, which are in the following embodiment combined in order to provide a particularly advantageous screen grouping.

Accordingly, at least one distance measure d(s1, s2) is derived for two given screen instances 110 s1 and s2 within a trail 100, 101, preferably one distance measure d(s1, s2) for each pair of screen instances 100 s1 and s2. On the derived distance measure(s), one or more of a variety of known stochastic clustering analysis algorithms may be applied. The resulting clusters of screen instances 110 then represent the screen groups 200 from which the map 250 of the legacy system 20 is built. For example, Spectral Clustering may be used as an exemplary clustering analysis algorithm Spectral clustering is especially advantageous, since it does not require specifying how many clusters (screen groups) are to be expected.

The distance measure may encapsulate information from the above three analysis modules 1012, 1014 and/or 1016. Given a pair of screen instances 110, screen parameter information (i.e. the scores derived during the statistical content analysis 1012) from each screen instance 110 may be compared numerically (see below) to provide a single distance score per pair of screen instances. Moreover, segment information (from the structure analysis 1014) may be compared (see below) to provide a numeric similarity score. The distance score and the numeric similarity score may be weighted in order to provide a combined parameter and segment based distance score ps=f(s1, s2) for a given pair of screen instances s1 and s2.

The navigation information (from the navigation pattern identification 1016) may furthermore indicate a screen instances similarity based on the trails 100, 101. The screen instances similarity may be combined with the combined parameter and segment based distance score ps to provide the final distance measure d(s1, s2).

In the following, each of the above presented sub-steps will be explained in more detail:

Comparing parameter information: The one or more scores calculated from the one or more screen parameters during statistical content analysis 1012 (see above) may be regarded as an n-dimensional vector per screen instance 110. Accordingly, the n-dimensional vectors of two given screen instances 110 may be compared e.g. by using Euclidian distance. The importance of each dimension within the respective vector may be empirically researched and considered in the comparison, e.g. by using a (normalized) weight vector. For example, the screen parameter indicating the number of unprotected fields (see above) in a screen instance may be considered a stronger match indicator than the number of characters on the screen. Defining a suitable weight vector is one way of taking such considerations into account during parameter information comparison.

In summary, the step of comparing parameter information preferably takes as input the scores derived for two given screen instances 110 during statistical content analysis 1012 and provides as output a distance score of the respective two screen instances 110, which may be calculated as described in the preceding paragraph.

Comparing segment information: As already presented further above, each screen instance 110 may be segmented into a number of areas (preferably rectangles), i.e. field partitions 140, of a limited number of types. An intersection of two given screen instances 110 may be calculated, wherein the intersection is defined as one or more corresponding areas comprising at least a subset of segments/field partitions 140 of the same type in each screen instance 110.

In the example of FIG. 10, two exemplary screen instances 110*a* and 110*b* are shown, wherein screen instance 110*a* comprises three segments/field partitions 140*a*1, 140*a*2 and 140*a*3 and wherein screen instance 110*b* comprises three segments/field partitions 140*b*1, 140*b*2 and 140*b*3. As can be seen when overlaying the two screen instances 110*a* and 110*b* in FIG. 10, the segments 140*a*1 and 140*b*1 match only partially, since segment 140*b*1 is larger than segment 140*a*1. The segments 140*a*2 and 140*b*2 match in shape, but differ in type. The segments 140*a*3 and 140*b*3 match in shape and type. Consequently, the intersection of the two screen instances 110*a* and 110*b* shown at the bottom of FIG. 10 and denoted as intersected screen instance 110' comprises one segment/field partition 140 that corresponds to the segments 140*a*3 and 140*b*3. Furthermore the intersected screen instance 110' comprises a field partition 140 that represents the intersection of the segments 140*a*1 and 140*b*1, i.e. the portion of those field partitions/segments that matches in shape and type.

Based on the intersected screen instance 110' of two screen instances 110, a numeric similarity score may be calculated, e.g. by dividing the segment intersection area by the area covered by a union of the segments of both screen instances 110. Note that the entire screen area may be segmented.

Calculating the final distance measure including the navigation information: Given a pair of screen instances 110 (s1, s2) and their respective trails 100, 101, the combined parameter and segment based distance score ps (see above) may be not only calculated for s1 and s2, as described above, but also for corresponding neighboring screen instances within the trails 100, 101. Each trail may to this end be considered as a directional graph, where the vertices/nodes represent the screen instances 110 and the edges represent the transitions between the screen instances, comprising navigational information, i.e. the user inputs and/or aid keys. Given a node on the graph, a neighbor of degree k may be defined on this graph to be a node that can be reached by traversing k transitions. Similarly, a neighbor of degree −k on this graph may be defined as a node that is reached by k transitions, wherein all transitions are traversed opposite to the direction of the edges in the graph.

For a given pair of screen instances 110 s1 and s2, one or more corresponding neighbors may be defined as two neighboring screen instances of s1 and s2, respectively, of the same degree k, wherein all respective pairs of transitions from both trails 100, 101 leading to the corresponding neighbors are similar and/or equal. As an example, FIG. 11 shows that the two screen instances s1 and s2 (shown in the middle of FIG. 11) have two preceding pairs of corresponding neighbors (the upper two pairs of screen instances) and one subsequent pair of corresponding neighbors (the last but one pair of screen instances in FIG. 11). The further screen instances do not correspond, because the respective user inputs leading to these screen instances do not match.

In order to calculate the final distance measure d(s1, s2) of two given screen instances s1 and s2, the combined parameter and segment based distance score ps=f(s1,s2) of s1 and s2 may be calculated, and furthermore the combined parameter and segment based distance score ps value for all pairs of corresponding neighbors of s1 and s2. The different combined parameter and segment based distance score ps values may then be combined in such a way that the weight of the pair of screen instances (s1,s2) is largest, while the weights of the corresponding neighbors decreases, e.g. proportional to the increasing of the absolute value of k (the degree of neighborhood; see above). For example, a Gaussian weight function over all corresponding neighbors may be employed, wherein the number of corresponding neighbors defines the standard deviation of the Gaussian. If no corresponding neighbors exist, the final distance measure score will simply be the value of the combined parameter and segment based distance score of s1 and s2, i.e. ps=f(s1,s2). Note that in case that the number of corresponding pairs in each direction is different (i.e. existing only on one side, either degree k or −k), the weight may be normalized accordingly.

Applying navigation pattern information: Additionally or alternatively, each trail 100, 101 may be preprocessed before running the grouping algorithm in step 1020. For example, given an exemplary trail 100, 101 comprising the three screen instances 110 s1, s2 and s3, the user input in the transitions leading to (s3) may be matching a key pattern on (s2) that has the meaning "back" (see the example in the pattern matching paragraph above). In this case, if the combined parameter and segment based distance score ps(s1,s3) indicates a high level of similarity, the screen instances s2 and s3 may be already grouped in advance, i.e. before the respective trail is processed in step 1020. As another example, in the exemplary trail (s1,s2), the user input in the transitions leading to (s2) may be matching a key pattern on (s1) that has the meaning "next" or "previous", which typically indicates a scrolling through a list or table with more rows than one screen can display. In this case, if the combined parameter and segment based distance score ps(s1,s2) indicates a high level of similarity, also the screen instances s1 and s2 may be grouped in advance.

The benefit of identifying such matches within the same trail is that it increases the average degree of neighbor correspondence, thus supporting the effectiveness of the navigation information in the trails. After such a preprocessing, a trail A→B→C→B→D→E (with A, B, C, D and E representing screen instances and wherein the transition C→B is identified to have the meaning "back"; cf. the trail on the left of FIG. 12) may be represented as a graph with two branches originating from screen B (cf. the pre-processed trail on the right of FIG. 12). As a result, neighbor information can be derived when matching the pre-processed trail shown on the right in FIG. 12 against other trails, such as A→B→D→E or A→B→C→F.

Furthermore, menu patterns may be used to improve the comparison of user inputs, as explained in the pattern matching paragraph further above.

FIG. 6 shows a map 250 that is the result of the grouping of the screen instances 110 of FIG. 5. As can be seen, the map 250 in FIG. 6 comprises corresponding screen groups 200, e.g. the top-most screen group 200 in FIG. 6 groups the three screen instances 110 labeled 'Sign On' in FIG. 5. Furthermore, also the user inputs from multiple trails 100, 101 have been grouped accordingly, as can be seen in FIG. 6.

Identifying Static/Dynamic Areas 1030

In step 1030, the fields 130 identified within the screen instances 110 are categorized into a set of static fields 132 and a set of dynamic fields 134. To this end, preferably per group 200 of screen instances 110, the differences are used to identify which area of a screen instance 110 is dynamic (e.g. output) and which is static (and can be used for the screen identification). Heuristics may be employed, since it cannot be assumed that every potentially dynamic area will indeed change in the sampled screen instances 110.

For example, the segmentation of the screen instances 110 into field partitions 140 (see further above) may be used in this task, i.e. if only one value (field 130) differs between screen instances 110 in the same field partition 140, the entire field partition 140 is considered to be dynamic. In this phase, the screen groups 200 become identified (through the static fields 134), but still have no names.

Additionally or alternatively, in particular if no decisive identifiers can be automatically found based on the available data, the screen groups 200 may be displayed to the developer in order to either manually and preferably interactively identify the screen groups 200 or to correct the generated grouping.

FIG. 7 depicts a refined map 250, wherein the fields 130 of the screen groups 200 have been categorized into static fields 132 and dynamic fields 134. As can be seen, the field 'Sign on' shown in the top-most screen group 200 in FIG. 7 is categorized as a static field 132, since the field 'Sign on' occurs in all corresponding screen instances 110 (cf. the trails 100 and 101 in FIG. 5) within the screen group 200. On the other hand, the field 130 represented in FIG. 7 by the rectangle in the top-most screen group 200 has been identified as a dynamic field 134, since the field does only occur in one of the corresponding screen instances 110 (see the second screen instance 110 in the trail 101 in FIG. 5), while it does not occur in the other corresponding screen instance 110 (see the top-most screen instance 110 in the trail 101 in FIG. 5). Furthermore, FIG. 7 shows a number of identified field partitions 140, which are represented by rectangles in the bottom and left-most screen group 200 in FIG. 7.

Categorizing Screens 1040

In step 1040, the identified screen groups 200 are categorized, i.e. at least one type is assigned to the screen groups 200 in order to determine what type of screen of the legacy system 20 is represented by the screen group 20. Predefined screen patterns, as explained for the navigational patterns further above, can be used to categorize screens. The present technology provides in some embodiments a number of predefined rules for determining the at least one type, examples of which are shown in the following table:

| Category | Description | Example categorization rules | Illustration |
|---|---|---|---|
| Menu | A list of options (typically application navigation) | One unprotected field Pattern found: 3 or more rows Short value Delimiter (dot\|spaces) Description | cf. FIG. 3a |
| Splash | An "illustration" made from text decorates a large part of the screen - typically a welcome page to an application | Screen parameters indicate repetition of the same limited set of characters | cf. FIG. 3b |
| Login | Where the uapplication ser enters his username and password | At least one unprotected fields and one unprotected hidden field | cf. FIG. 3c |
| Table | A table of dynamic data organized in columns | 3 or more aligned column partitions with the same number of rows (4 or more rows) | cf. FIG. 3d |
| Details | A screen displaying dynamic data of a single application entry | Many label + value pairs, no (or very few) unprotected fields | cf. FIG. 3e |
| Query* | A screen to define a search criteria over tabular data | A number of label + unprotected fields | cf. FIG. 3f |
| Insert/ Update* | A screen to update values of an entry or insert a new one to the application database | A number of label + unprotected fields | cf. FIG. 3g |
| Help* | A screen providing help or relevant values for a specific field | A framed "window" containing text and/or a list with selection fields | cf. FIG. 3h |
| Message* | A screen with a message to the user which may interfere with the regular work flow of the application. [enter] is typically enough to continue | No unprotected fields A partition of free text | cf. FIG. 3i |

It is noted that using the above exemplary rules, it may in some scenarios not be possible to separate e.g. screens of type 'Query' from screens of type 'Insert/Update'. These categories/types may be identified at a later stage, e.g. based on a semantic analysis of user input 140 leading to the screen respective (see further below). The 'Help' category may be identified based on the corresponding send key 'help" (preferably combined with the cursor position) which leads to the corresponding screen. Message rules are also difficult to identify, but may be identified combined with navigation information (i.e. user inputs 140), e.g. if a message "exiting this screen with [enter] key" is found.

FIG. 8 shows a correspondingly further refined map 250, in which the screen groups 200 have been assigned corresponding types (cf. the labels 'Login', 'Menu' and 'Table' attached to the screen groups 200).

Assigning Semantic Information 1050

In step 1050, the map 250 generated so far may be further refined with a variety of further semantic information extracted from the trails 100, 101, examples of which are explained in the following:

Per screen group 200: Depending on the identified category/type of a screen group 200, the map 250 may be amended with additional valuable information, such as:

for 'Menu' type screen groups 200: a list of possible actions (e.g. a list of value/caption pairs);

for 'Login' type screen groups 200: the user and password input fields;

for 'Table' type screen groups 200: a definition of named columns, rows, navigation rules, etc.;

for 'Details' type screen groups 200: named output fields, a (sequence) data structure related to a specific Table screen;

for 'Query'/'Insert'/'Update' type screen groups 200: named input fields.

Furthermore, by running certain trails 100, 101 again (i.e. a second time) against the map 250 generated so far, further semantic information may be added to the map 250 by taking into account the sequence within the respective trail 100, 101, e.g.:

Name: The name of a screen group 200 may be extracted based on menu navigation and/or the assumed title on the respective screen instances 110;

Neighbor relationships: For each screen group 200, the Actions (values and aid keys) and parameters (user defined values) may be identified that are required for navigation between the screen groups 200;

In case of 'Menu' type screen groups 200, a list of actions is typically without parameters and may be matched to the screen information. In other cases, values in input fields 130 are typically user-defined parameters (such as query parameters). In 'Table' type screen groups 200, oftentimes a specific value will always lead to the same screen, but the user selects on which row to act, making the table row number an action parameter. Lastly, the relationship between a 'table' and an 'update/details' screen group 200 can valuable information for automating data entry and retrieval.

Incremental Execution

The present method may further take advantage of existing screen identification techniques, so that manual work is not wasted, imported screen maps may be used, and running the steps of the method again after more user data was collected does not override already tested maps 250. For such existing definitions the present technology may suggest at least some of the following improvements (which may be required to be approved by a developer): a new name for a screen group 200, new neighbor information, more semantic data (tables, menus, fields, etc).

The grouping algorithm (cf. step 1020) can be further improved to consider existing screen identification rules when analyzing new trails to become more effective in identifying new screens. Screen instances 110 that match identification rules of known screens will be automatically grouped under this screen identity and their distance measure function will indicate zero distance. This will further improve the effectiveness of corresponding neighbors to the distance measure, as explained further above in the context of the grouping algorithm (applying navigation pattern information).

Summary

In summary, in some embodiments described herein, the modeling may comprise collecting real user interactions (sessions) over a period of time, analyzing the collected data and generalizing it to a common model, taking into account the sequence of screens of each session and the transitions in it. The present technology thereby overcomes at least part of the following disadvantages of approaches known from the prior art: Navigation steps are typically captured based on developer's (rather than user's) navigation through the system, using a specific developer tool. Manual (or template based) tagging of unique combinations of screen data is required. Importing host screen maps (e.g. Cobol BMS/MFS, Natural maps) cannot capture navigational information and relations between screens. Screen names typically follow the map name which might be not very descriptive to the user. "Crawling" must be limited to a test environment or to screens that do not modify data. Automatic analysis of each separate screen buffer based on heuristics and manual rules requires intensive manual correction. Other approaches require distinct components on the mainframe (e.g. datadirect, JIS innovator), while the present technology takes a "zero footprint" approach.

To this end, various embodiments of the present technology provide improved heuristics per screen, e.g. based on a segmentation or partitioning of screens, the usage of semantic screen information combined with screen sequence, analyzing large amounts of actual user information captured by a redirector, which enables an automatic analyzing of the legacy system that relies on real life usage, using application specific rules when capturing trails and/or using screen segmentation into blocks/partitions and compare data from different instances to identify dynamic or static areas, and to categorize screens according to partition layout rules. Furthermore, some embodiments involve using the sequence of each trail to help matching screens from different screens using at least some of the following assumptions: It is likely that all trails start in the same screen (or a very small group of screens), specific user actions from a specific screen A are likely to lead to the same screen B in different trails, a semantic understanding of the AID keys (PF keys) can help estimate what the next screen is (e.g. "back" will lead to the previous screen, "down"/"up" will keep the legacy system in the same screen and imply the existence of a table or a list, "help" will lead to a help type screen, etc.), a semantic understanding of menu options combined with the actual option that was selected can help to provide names and categorize the next screen.

The invention claimed is:

1. A method for analyzing a legacy system based on at least one trail, wherein the at least one trail comprises a plurality of instances of screens of the legacy system and a plurality of segments within each screen instance in the plurality of instances of screens, the method comprising:

calculating a numerical score based on a plurality of pair-wise distance measures of the plurality of segments within each screen instance, in the plurality of screen instances, in the at least one trail, wherein the pair-wise distance measures indicate a similarity of the respective pair of screen instances that indicates that the pair may originate from the same screen of the legacy system; and applying at least one cluster analysis algorithm on the plurality of pair-wise distance measures to group the screen instances into at least one screen group and building a map of the legacy system based on the at least one screen group, wherein the screen instances are grouped, in part, based upon the calculated numerical score, and wherein the calculating comprises calculating at least one combined parameter and segment based distance score of at least one pair of corresponding neighbors of a given pair of screen instances.

2. The method of claim 1, wherein the calculating comprises calculating a pair-wise distance score of the plurality of screen instances, wherein the pair-wise distance score indicates a similarity of the respective pair of screen instances that indicates that the pair may originate from the same screen based on the content of the respective screen instances.

3. The method of claim 2, wherein the pair-wise distance score is calculated based on at least one screen parameter such as the amount of alpha-numeric characters, the amount of unprotected fields, the amount of unprotected hidden fields, the amount of digits, the amount of alpha characters, the amount space characters, the amount of unique characters, a column entropy score, the amount of unique colors, the amount of characters in reversed video mode, the amount of characters in intensified mode, the percentage of characters in uppercase compared to all characters, the amount of words and/or any combination thereof.

4. The method of claim 2, wherein the calculating comprises combining the pair-wise distance score and the pair-wise similarity score of a given pair of screen instances into a combined parameter and segment based distance score based on a pre-defined weight function.

5. The method of claim 1, wherein the calculating comprises calculating a pair-wise similarity score of the plurality of screen instances, wherein the pair-wise similarity score indicates a similarity of the respective pair of screen instances that indicates that the pair may originate from the same screen based on the structure of the respective screen instances.

6. The method of claim 5, wherein the pair-wise similarity score is calculated based on an identification of at least one field partition in the respective screen instance, wherein the at least one field partition comprises a plurality of related fields within a screen instance.

7. The method of claim 1, wherein the calculating comprises identifying at least one navigation pattern within the at least one trail and grouping the screen instances within the at least one trail according to the at least one identified navigation pattern.

8. The method of claim 1, further comprising grouping a plurality of fields comprised in a given screen instance into a set of static fields and a set of dynamic fields and assigning the given screen instance to the at least one screen group based on the set of static fields while ignoring the set of dynamic fields.

9. The method of claim 1, further comprising categorizing the at least one screen group by matching the at least one screen group against a predefined rule set and assigning at least one type to the screen group according to the rule set.

10. The method of claim 1, wherein the calculating comprises identifying at least one navigation pattern within the at least one trail, the at least one navigation pattern reflecting an observed sequence of screen instances, and grouping the screen instances within the at least on trail according to the at least one identified navigation pattern.

11. The method of claim 10, wherein the at least one navigation pattern is identified from within a plurality of trails.

12. The method of claim 1, wherein the numerical score is calculated based on a combination of a single distance score, derived from a numerical comparison of screen parameter information of a pair of screen instances, and a numeric similarity score derived from a comparison of segment information in the pair of screen instances.

13. The method of claim 12, wherein a screen instance similarity score is calculated based on navigation information in the screen instances and the screen instance similarity score is used in combination with the single distance score and the numeric similarity score in calculating the numerical score.

14. The method of claim 1, further comprising:
determining an intersection of one or more segments between the plurality of screen instances;
calculating the numerical score between the plurality of screen instances based on the determined intersection of the one or more segments; and
applying the at least one cluster analysis algorithm on the plurality of pair-wise distance measures based on the calculated numerical score.

15. The method of claim 1, wherein the screen instances are partitioned into one or more partitions using image segmentation to identify geometric areas containing a uniform type of text, and the screen instances are grouped based on similarities between the identified geometric areas formed from the one or more partitions.

16. The method of claim 15, further comprising:
determining which partitions of the one or more partitions contain dynamic data and which partitions of the one or more partitions contain static data; and
categorizing screen instances taking into account the partitions containing dynamic data and the partitions containing static data.

17. A non-transitory computer readable storage medium tangibly storing a computer program comprising instructions for analyzing a legacy system based on at least one trail, wherein the at least one trail comprises a plurality of instances of screens of the legacy system and a plurality of segments within each screen instance in the plurality of instances of screens, the instructions, when executed by a computer having at least one processor, perform features comprising:
calculating a numerical score based on a plurality of pair-wise distance measures of the plurality of segments within each screen instance, in the plurality of screen instances, in the at least one trail, wherein the pair-wise distance measures indicate a similarity of the respective pair of screen instances that indicates that the pair may originate from the same screen of the legacy system; and
applying at least one cluster analysis algorithm on the plurality of pair-wise distance measures to group the screen instances into at least one screen group and building a map of the legacy system based on the at least one screen group,
wherein the screen instances are grouped, in part, based upon the calculated numerical score, and
wherein the calculating comprises calculating at least one combined parameter and segment based distance score of at least one pair of corresponding neighbors of a given pair of screen instances.

18. A computer system for analyzing a legacy system based on at least one trail, wherein the at least one trail comprises a plurality of instances of screens of the legacy system and a plurality of segments within each screen instance in the plurality of instances of screens and wherein the computer system comprises:
at least one processor;
a screen identification component configured to calculate, via the at least one processor, a numerical score based on a plurality of pair-wise distance measures of the plurality of segments within each screen instance, in the plurality of screen instances, in the at least one trail, wherein the pair-wise distance measures indicate a similarity of the respective pair of screen instances that indicates that the pair may originate from the same screen of the legacy system;
wherein the screen identification component is further configured to apply at least one cluster analysis algorithm on the plurality of pair-wise distance measures to group the screen instances into at least one screen group and to build a map of the legacy system based on the at least one screen group,
wherein the screen instances are grouped, in part, based upon the calculated numerical score, and
wherein the calculating comprises calculating at least one combined parameter and segment based distance score of at least one pair of corresponding neighbors of a given pair of screen instances.

19. The system of claim 18, further comprising a redirector configured to record the at least one trail by analyzing communication between the legacy system and at least one terminal during at least one live user session.

20. The system of claim 18, wherein the redirector is configured to record a plurality of trails and to store the plurality of recorded trails in a data store, and wherein the screen identification component is configured to analyze the plurality of stored trails.

* * * * *